Oct. 29, 1940.  W. GRAF  2,219,838
APPARATUS FOR MAINTAINING A DESIRED SPEED RELATION BETWEEN TWO SHAFTS
Filed March 19, 1938
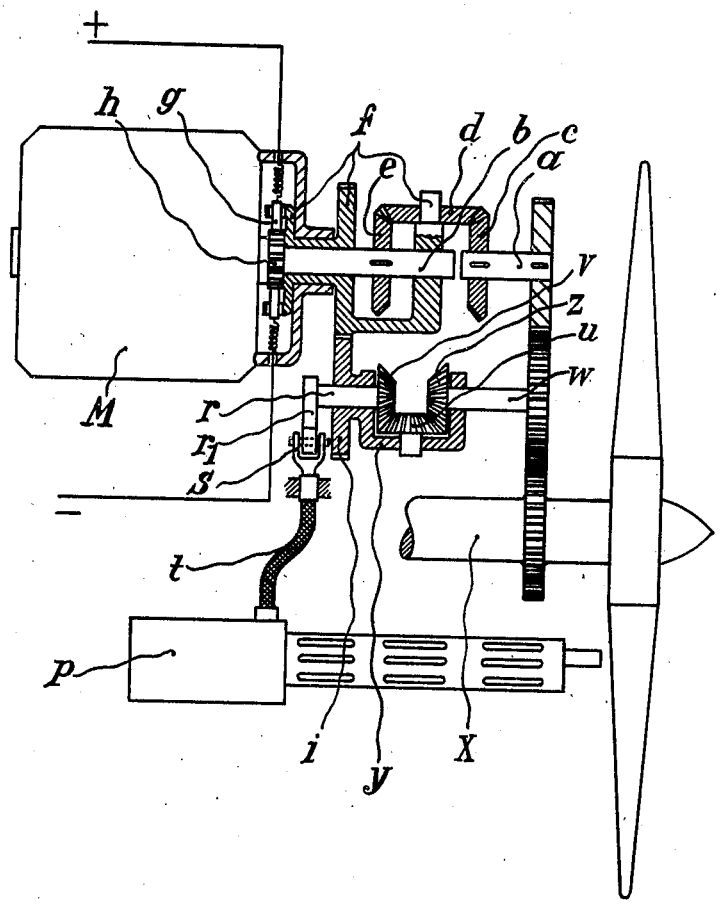
Inventor:
Walter Graf
By
Young, Owen + Thompson
Attorneys

UNITED STATES PATENT OFFICE 2,219,838

APPARATUS FOR MAINTAINING A DESIRED SPEED RELATION BETWEEN TWO SHAFTS

Walter Graf, Berlin-Konradshöhe, Germany, assignor to Rheinmetall-Borsig Aktiengesellschaft, Dusseldorf, Germany, a corporation of Germany Application March 19, 1938, Serial No. 197,025
In Germany August 8, 1936

5 Claims. (Cl. 89—27)

The invention relates to an apparatus for maintaining a desired speed relation between two shafts which comprises a differential gear which adjusts the brush carrier of an electric motor in dependence on the movements of a control shaft in such a manner that the speed of the motor has a fixed relation to the speed of the control shaft in each particular case. Such apparatus for the synchronous transmission of the movements of a control shaft for magnifying the adjusting power of the shaft, which power is only slight, are already known.

According to the invention, the angular movement of the planet carrier of a differential gear which causes the displacement of the brushes of the electric motor, said movement being dependent upon the change in speed of the control shaft, is utilised for initiating further control operations which are dependent on the alterations in the speed of the control shaft. Thus, for example, the displacement of the planet carrier when the speed of the control shaft changes, may be employed in a particularly simple manner to adjust the moment of firing of a gun which fires through the area swept by an air-screw.

The invention can also be applied in all other arrangements, in which an operation is produced in dependence on the variable speed of a control shaft, utilizing the angular displacement of a planet wheel carrier.

The accompanying drawing shows an example of a control device constructed in accordance with the invention and showing a side view with certain parts in section of the device for synchronizing a machine gun to fire between the blades of a propeller.

A control shaft $a$ driven by the airscrew shaft $x$ carries a bevel wheel $c$ which, together with bevel wheels $d$ and $e$ and a device $f$ which comprises a planet carrier and the brush carrier of an electric motor M, forms a differential gear. When the spindle $b$ of the motor M runs at the same speed but in reverse direction to that of the shaft $a$, then the planet carrier $f$ remains stationary. When, however, the speed of the shaft $a$ differs from that of the spindle $b$, the planet wheel $d$ with the device $f$ will revolve about the shaft $b$ in one direction or the other. The brushes $g$ of the motor M are thereby moved about the commutator $h$ and thereby change the speed of the motor M until identity of the speeds of the shaft $a$ and spindle $b$ has been re-established. The device $f$ remains in the new position corresponding to the changed speed. Thus its relative position is an indication of the speed at the moment.

Teeth on the device $f$ mesh with those on a gear wheel $i$ which wheel together with the toothed wheels $u$, $v$, $z$ forms a second differential gear which is driven synchronously by the airscrew shaft $x$ by way of the shaft $w$. The drive to the wheel $v$ is effected through the shaft $r$ which carries a cam $r_1$ which co-operates with a cam follower $s$, and thus acts on the trigger of a gun by way of a Bowden cable $t$. Movement of the device $f$ produces a movement of the wheel $i$, and, therefore, an angular displacement between the shafts $w$ and $r$, the result of which is to effect a change of the moment of firing the gun $p$ in relation to the position of the airscrew.

Instead of the differential gear $i$, $u$, $v$, $z$ there may, of course, be used other known means, in order to utilise the displacement of the device $f$ so as to change the moment of firing.

The invention can, of course, also be used for other control operations rendered dependent upon an adjustment of the device $f$ corresponding to the speed of the shaft $a$, for example for the automatic adjustment of correction in sighting, in that variations of the position of the device $f$ which is dependent upon the speed of a laying shaft corresponding to the control shaft $a$, are transmitted to an automatic sighting device by way of a mechanism $i$ in dependence on the velocity of a target which is being followed by a gunner.

Having now particularly described and ascertained the nature of my said invention and in what manner the same is to be performed, I declare that what I claim is:

1. Mechanism for synchronizing the rotation of a variable speed control shaft with that of an operating shaft, comprising differential gear driven by the control shaft, said gear including a planet wheel and carrier therefor, an electric motor having a shaft in driving connection with said differential gear, speed-regulating brush-shifting means for said motor movable by said planet wheel carrier to maintain said motor shaft in synchronism with said control shaft, and means for transmitting the regulating movements of said brush shifting means to the operating shaft.

2. Mechanism for synchronizing the rotation of a propeller shaft with that of a shaft for timing the firing of a machine gun through the propeller comprising, differential gear driven by the propeller shaft, said gear including a planet wheel and carrier therefor, an electric motor having a shaft in driving connection with said differential gear, speed regulating brush-shifting means for said motor movable by said planet wheel carrier to maintain said motor and propeller shafts in synchronism, and means transmitting the regulating movements of said brush shifting means to the timing shaft.

3. Mechanism for synchronizing the rotation of a propeller shaft with that of a shaft for timing the firing of a machine gun through the propeller comprising, differential gear driven by the propeller shaft, said gear including a planet wheel and carrier therefor, an electric motor having a shaft in driving connection with said differential gear, speed regulating brush-shifting means for said motor movable by said planet wheel carrier to maintain said motor and propeller shafts in synchronism, and means transmitting the regulating movements of said brush shifting means to the timing shaft, said transmitting means including a second differential gear coupled to said propeller shaft and said timing shaft and having a planet wheel carrier in gear with the planet wheel carrier of the first differential gear.

4. Mechanism for synchronizing the rotation of a variable speed control shaft with that of an operating shaft, comprising differential gear driven by the control shaft, said gear including a planet wheel and carrier therefor, an electric motor having a shaft in driving connection with said differential gear, speed regulating brush-shifting means for said motor movable by said planet wheel carrier to maintain said motor shaft in synchronism with said control shaft, and means for transmitting the regulating movements of said brush shifting means to the operating shaft, said transmitting means including a second differential gear coupled to said control and operating shafts and having a planet wheel carrier in gear with the planet wheel carrier of the first differential gear.

5. Mechanism for timing the firing of a machine gun through the path of rotation of a propeller comprising, a shaft driven by the propeller, an electric motor having a shaft, a differential gear set having gear wheels coupled to the propeller and motor shafts and a planet wheel gear and carrier, speed regulating brush-shifting means adapted to maintain said propeller and motor shafts at equal revolutionary speeds said brush shifting means being angularly movable by said planet wheel carrier, a shaft operating means for firing the machine gun, and a second differential gear set having gear wheels coupled to said propeller and firing shafts and a planet gear and carrier in mesh with the planet wheel carrier of the first differential gear set.

WALTER GRAF.